United States Patent [19]

Jordan et al.

[11] Patent Number: 5,334,672

[45] Date of Patent: * Aug. 2, 1994

[54] AROMATIC POLYMER BLENDS AND METHOD

[75] Inventors: Therese C. Jordan, Saratoga Springs; Jimmy L. Webb, Ballston Lake, both of N.Y.

[73] Assignee: General Electric Company, Schenectady, N.Y.

[*] Notice: The portion of the term of this patent subsequent to Feb. 16, 2010 has been disclaimed.

[21] Appl. No.: 46,874

[22] Filed: May 27, 1993

Related U.S. Application Data

[63] Continuation of Ser. No. 928,397, Aug. 12, 1992, abandoned, which is a continuation of Ser. No. 736,547, Jul. 26, 1991, abandoned.

[51] Int. Cl.$^5$ .................. C08L 67/02; C08L 83/04
[52] U.S. Cl. ................................. 525/446; 525/474; 525/431; 525/393; 525/106
[58] Field of Search ........................... 525/446

[56] References Cited

U.S. PATENT DOCUMENTS

| | | | |
|---|---|---|---|
| 3,539,657 | 11/1970 | Noshay et al. | 525/534 |
| 3,861,915 | 1/1975 | Cawley | 430/56 |
| 4,344,878 | 8/1982 | Dolce | 524/409 |
| 5,032,661 | 7/1991 | Serini et al. | 528/21 |
| 5,034,474 | 7/1991 | Hamilton | 525/446 |
| 5,041,514 | 8/1991 | Webb et al. | 528/25 |
| 5,084,527 | 1/1992 | Yamamoto et al. | 525/446 |
| 5,187,243 | 2/1993 | Jordan et al. | 525/464 |

Primary Examiner—John C. Bleutge
Assistant Examiner—Margaret W. Glass
Attorney, Agent, or Firm—William A. Teoli; William H. Pittman

[57] ABSTRACT

Flame retardant blends of poly(aryloxysiloxane) and organic polymers such as polyethers, polyesters, polyetherimides and terpolymers of acrylonitrile-butadiene-styrene are provided. In many instances, the flame retardant blends exhibit improved chemical resistance, impact resistance and have an improved heat deflection temperature as compared to the original polymeric materials.

2 Claims, No Drawings

AROMATIC POLYMER BLENDS AND METHOD

This application is a continuation of application Ser. No. 07/928,397, filed 08/12/92, now abandoned which was a continuation of Ser. No. 07/736,547, filed 07/26/91, also abandoned.

REFERENCE TO COPENDING APPLICATIONS

Reference is made to copending application Ser. No. 07/497,155, filed 3/21/90 for Polymeric Reaction Products of Biphenols and Organosilicon Materials and Method for Making, now U.S. 5,041,514, which is a continuation in part of copending application Ser. No. 07/353,713, filed May 18, 1989 now abandoned, and copending application 07/646,902, filed Jan. 28, 1991, now U.S. 5,187,243.

BACKGROUND OF THE INVENTION

The present invention relates to a method for improving the flame retardance of a variety of aromatic organic polymers such as polyarylene ethers, polyetherimides, and polyesters by blending the respective polymers with poly(aryloxysiloxane)s. The resulting polymer blends also show an enhancement in properties such as an improved heat deflection temperature (HDT), solvent resistance, impact strength and ultimate elongation.

In copending application, Ser. No. 07/497,155, filed Mar. 21, 1990, and incorporated herein by reference, there is shown Polymeric Reaction Products of Biphenols and Organosilicon Materials, such as poly(aryloxysiloxane)s, and preferably poly(silyloxybiphenyleneoxide)s, hereinafter referred to as "PAS", consisting essentially of chemically combined groups of the formula,

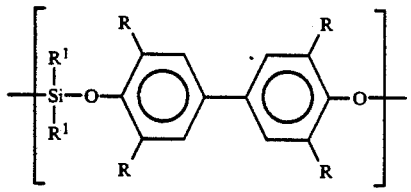

where R in formula (1) is selected from the same or different $C_{(1-8)}$ alkyl radicals, and $R^1$ is selected from the same or different $C_{(1-13)}$ monovalent hydrocarbon radicals, and $C_{1-13}$ monovalent hydrocarbon radicals substituted with monovalent radicals inert during condensation. PAS of formula (1) has been found to have improved hydrolytic stability. It also is a high molecular weight injection moldable material exhibiting flame resistant properties.

In copending application 07/646,902, now U.S. 5,187,243 filed Jan. 28, 1991, flame retardant transparent blends of aromatic polycarbonate and PAS are shown which exhibit excellent mechanical properties, such as Notched Izod Impact.

SUMMARY OF THE INVENTION

The present invention is based on the discovery that broad range blends of PAS and various aromatic polymers, such as poly(butyleneterephthalate) (PBT), poly(etherimide) (PEI), acrylonitrile-butadiene-styrene terpolymer) (ABS), and polyphenylene ether (PPE), exhibit improved properties such as flame retardance, various physical characteristics and/or solvent resistance.

STATEMENT OF THE INVENTION

There is provided by the present invention, a method of improving the flame retardance of an aromatic organic polymer selected from the class consisting of poly alkyleneterephthalates, polyetherimides, ABS terpolymers, and polyphenylene ethers which comprises, (1) melt extruding a blend comprising 10% to 90% by weight of the aromatic organic polymer and from 10 to 90% by weight of poly(arylsiloxane) of formula (1), based on the total weight of the resulting extrudate, and (2) recovering the melt extruded blend of (1).

A preferred method for making PAS of formula (1) and particularly Poly(silyloxytetraalkylbiphenyleneoxide)s is by effecting reaction between a tetraalkylbiphenol of the formula,

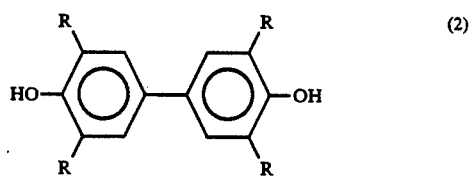

and a difunctional organosilicon material selected from the class consisting of a polyorganosilazane, a cyclopolyorganosilazane, and an organosilane of the formula,

(B) recovering the resulting poly (silyloxytetraalkylbiphenyleneoxide), where R and $R^1$ are as previously defined, and X is a hydrolyzable radical, and is preferably chloro.

Radicals included by R of formulas (1) and (2) are alkyl radicals, such as methyl, ethyl, propyl, butyl, pentyl and hexyl; radicals included by $R^1$ are, for example, R radicals as previously defined, and substituted R radicals, such as trifluoropropyl, cyanoalkyl, such as cyanoethyl and cyanopropyl; alkenyl radicals such as vinyl and propenyl; cycloaliphatic radicals, such as cyclopentyl, and cyclohexyl. $R^1$ also can be aryl radicals, such as phenyl, xylyl, tolyl, naphthyl and anthryl; and halogenated aryl radicals, such as chlorophenyl and bromotolyl, as well as nitroaryl radicals, such as nitrophenyl and nitrotolyl.

Radicals included within X of formula (3) are for example halo, such as chloro, amino, amido, imido, ureido, alkoxy and acyloxy.

Polyesters suitable for blending with PAS of formula (1) can be any of the linear or branched saturated polyesters known to those skilled in the art. Generally, the polyesters will comprise linear saturated polyesters derived from alkylene glycols such as ethylene glycol, propylene glycol, 1,4-butanediol, etc. including cycloaliphatic glycols, such as 1,4-cyclohexanedimethanol and mixtures of any of these glycols with one or more aromatic dicarboxylic acids. Preferably, the polyesters can comprise polyalkyene terephthalates prepared by known techniques, such as the transesterification of esters of terephthalic acid alone or mixtures of esters of terephthalic acid and isophthalic acid with a glycol or a mixture of glycols, or the polymerization by heating the glycols with the free acids or halide derivatives thereof. Suitable methods are described in U.S. Pat. Nos. 2,465,319 and No. 3,045,539 incorporated herein by reference. In addition, blends of one or more of these polyesters or copolyesters may be employed. A suitable poly(1,4-butylene terephthalate) resin is commercially available from General Electric Company under the trade designation VALOX® 315 and poly(ethylene terephthalate) resins are well known and available commercially.

Some of the polyphenylene ethers which can be used in the making blends in the practice of the invention are shown by the following formula,

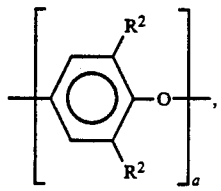

where $R^2$ is a monovalent radical selected from the class consisting of hydrogen, halogen, hydrocarbon radicals free of a tertiary α-carbon atom, halogenated hydrocarbon radicals having at least two carbon atoms between the halogen atom and the phenyl nucleus, hydrocarbonoxy radicals and halogenated hydrocarbonoxy radicals having at least two carbon atoms between the halogen atom and the phenyl and a is an integer having a value of at least 50.

A more preferred class of polyphenylene ether resins for the blends of the present invention are where $R^2$ is alkyl and, most preferably, having from 1 to 4 carbon atoms. Illustratively, members of this class include poly (2,6-dimethyl-1,4-phenylene) ether; poly (2,6-diethyl-1,4-phenylene)ether; poly (2-methyl-6-ethyl-4-phenylene)ether; poly (2-methyl-6-propyl-1-4-phenylene)ether; poly (2,6-dipropyl-1,4-phenylene) ether; poly (2-ethyl-6-propyl-1,4-phenylene)ether. The polyphenylene ethers preferably have an intrinsic viscosity of about 0.45 deciliters per gram (dl./g.) as measured in chloroform at 30° C.

The preparation of the polyphenylene ether resins is described in Hay, U.S. Pat. Nos. 3,306,874 and 3,306,875 and in Stamatoff, U.S. Pat. Nos. 3,257,357 and 3,257,358, which are incorporated herein by reference.

Among the polyetherimides which can be blended with PAS in the practice of the invention are polymers shown in U.S. Pat. Nos. 3,833,546 and 3,847;867, which are incorporated herein by reference. Preferably reaction is effected under neat conditions between an aromatic bis (etheranhydride), such as 2,2-bis [4- (3,4-dicarboxyphenoxy)phenyl]propane dianhydride and an aromatic organic diamine for example m-phenylene diamine or a mixture thereof with p-phenylene diamine.

ABS resins which can be blended with the PAS to produce flame retardant extrudable materials include the ABS terpolymers shown by Morneau et al, Vol I, in the Kirk Othmer Encyclopedia of Chemical Technology, 3rd Edition (1978) John Wiley & Sons NY, pages 442–450 which is incorporated herein by reference. An emulsion polymerization process is used involving the formation of a polybutadiene substrate and the grafting of styrene and acrylonitrile onto the polybutadiene substrate and the formation of a random copolymer of butadiene and styrene (SBR). Additional procedures are shown in Encyclopedia of Polymer Science and Engineering, Vol. I (1985), pages 400–408, John Wiley and Sons, New York.

In the practice of the invention, one of the aforementioned organic polymers and PAS can be dry blended and extruded in a co-rotating Twin Screw extruder. The temperatures in the extruder can vary from about 230° C. to 300° C. The resulting strands can be collected, pelletized and injection molded.

There can be incorporated into the blends of the present invention, stabilizers such as, Ultranox 626 of GE Co., Irganox 3114 and MD-1024 of Ciba Geigy, and Naugard XL-1 of Uniroyal, which can be utilized at from 0.5 to 5% by weight based on the total weight of the blend. In addition, impact modifiers, such as a methacrylate-butadiene (KM653) can be used. The blends of the present invention can be used as high performance injection moldable thermoplastics.

In order that those skilled in the art will be better able to practice the present invention the following example is given by way of illustration and not by way of limitation. All parts are by weight.

EXAMPLE

Several blends were prepared from PAS and organic polymers such as poly(butylene terephthalate) (PBT), poly(ether imide) (PEI) resulting from the reaction of 2,2-bis[4-(3, 4-carboxyphenoxy) phenyl] propane dianhydride and meta-phenylene diamine, acrylonitrile-butadiene-styrene terpolymer (ABS) and poly (2,6-dimethyl-1,4-phenylene) ether (PPE). The blends were prepared by dry mixing the components followed by extrusion in a 20 mm co-rotating Twin Screw extruder. In all of the extruding operations, the screw speed was 400 rpm and the feed rate ranged from 115°–165° C. The temperatures in the extruder ranged from 177° C. (zone 1) to 293° C. (die temperature). The resulting strands were collected, pelletized and injection molded in ⅛th inch Izod and tensile bars on a 28 ton molding machine. Injection molding of the extruded blends was carried out using an 8 second injection time in a 27 second cycle and a barrel zone temperature ranging from 232° C. to 332° C. When blending ABS terpolymer, small quantities of hindered phenol stabilizers were added including Ultranox 626 of the GE Co. and Irganox 3114 of the Ciba Geigy Co. In preparing the blends, there was employed from 15 to 50 parts of the polymer per 100 parts of PAS.

The various blends were then evaluated for heat deflection temperature (HDT) by cutting test specimens from the center of ⅛" tensile bars. HDT testing was done at 264 psi and a 2° C./min heating rate. Samples were tested in accordance with ASTMD 648. The following shows the HDT of the various materials evaluated, and blends of equal part by weight of PAS and PBT, PPE or PEI:

| Material | HDT, °C. |
|---|---|
| PAS | 115 |
| PBT | 51 |
| PPE | 182 |
| PEI | 196 |
| PAS/PBT | 74 |
| PAS/PPE | 125 |
| PAS/PEI | 125 |

An 80/20 blend of PAS and PEI showed a 10° C. improvement and exhibited a weight loss of less than 1%.

Samples of the blends were also evaluated for chemical resistance by being placed in hot chloroform for 45 minutes, decanting and treating with fresh solvent. The samples were then dried in a vacuum oven for 4 hours and checked for weight loss. It was found that pure PAS lost 81% by weight, while pure PBT, and a 50/50 blend by weight of PAS and PBT lost less than 1%.

In addition to chemical resistance and HDT, some of the blends of the present invention were also evaluated for UL-94 flammability using ⅛th inch tensile bars. A test sample exhibited a UL-94 V-0 rating, if it satisfied the following criteria:

A. Not have any specimen which burns with flaming combustion for more than 10 seconds after application of the test flame.

B. Not have a total flaming combustion time exceeding 50 seconds for 10 flame applications of each set of five specimens.

C. Not have any specimens which burn with flaming or glowing combustion up to the holding clamp.

D. Not have any specimens which drip flaming particales that ignite dry absorbent surgical cotton located 12 inches (305 mm) below the test specimen.

E. Not have any specimens with glowing combustion which persists for more than 30 seconds after the second removal of the test flame.

It was found that a 68/17/15 blend of PAS/SAN575/HRG360 was a completely ductile material having marginal V-0 or V-1 properties. In addition the blend showed superior blunt notch impact strength (ft-lb/in) and sharp notch impact strength (ft-lb/in) as compared to pure ABS.

Although the above example is directed to only a few of the very many variables which can be utilized in the practice of the present invention, it should be understood that the present invention is directed to a much broader variety of blends of PAS and organic polymers as set forth in the description preceeding this example.

What is claimed is:

1. A polybutylene terephthalate blend having improved flame retardance comprising about equal parts by weight of a polybutylene terephthalate and a poly(arylsiloxane) having the formula,

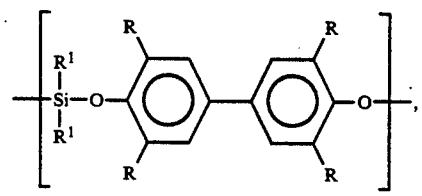

where R is selected from the group consisting of the same or different $C_{(1-8)}$ alkyl radicals, and $R^1$ is selected from the group consisting of the same or different $C_{(1-13)}$ monovalent hydrocarbon radicals, and $C_{(1-13)}$ monovalent hydrocarbon radicals substituted with monovalent radicals inert during condensation.

2. A method in accordance with claim 1, where the poly(arylsiloxane) is a poly(dimethylsiloxybiphenyleneoxide).